June 8, 1937.  S. J. GABER  2,082,827

DRAIN PIPE SYSTEM

Filed April 22, 1936

INVENTOR
SAMUEL J. GABER
BY
ATTORNEY

Patented June 8, 1937

2,082,827

UNITED STATES PATENT OFFICE 2,082,827

DRAIN PIPE SYSTEM

Samuel J. Gaber, New York, N. Y.

Application April 22, 1936, Serial No. 75,779

5 Claims. (Cl. 182—17)

The present invention relates to drain-pipe systems for buildings, and is concerned more particularly with a system designed to facilitate cleaning of the trap.

In most cases, when the drain-pipe system of a building is obstructed, the point of obstruction is in the trap and, for that reason, it is necessary to open the trap for the purpose of cleaning the latter and removing the cause of the obstruction. In many buildings, however, the trap is disposed within a pit located below the level of the basement floor of the building. This pit becomes filled with drainage water, especially when the trap is blocked, such drainage leaking into the pit through various pipe joints. Therefore, in order to obtain access to the trap to clean the latter and remove the obstruction, it is necessary first to bail out the pit. This is a disagreeable task and, as it takes up a considerable amount of time, it is costly as well. One of the objects of the present invention, therefore, is to obviate the necessity for bailing out the pit in order to obtain access to the trap for cleaning the latter.

In accordance with the present invention, provision is made for permitting the flow of liquid from the pit into the outlet pipe when it becomes necessary to clean the trap, and this is accomplished by providing a pit-draining passage at the outlet side of the trap having a valve or other means for sealing said passage to prevent the flow of sewer gas from the outlet pipe into the pit. Another object of the invention is to provide a sealing device which can be operated from a point adjacent the top of the pit.

The above objects of the invention and other objects ancillary thereto will best be understood from the following description considered with reference to the accompanying drawing.

Figure 1:
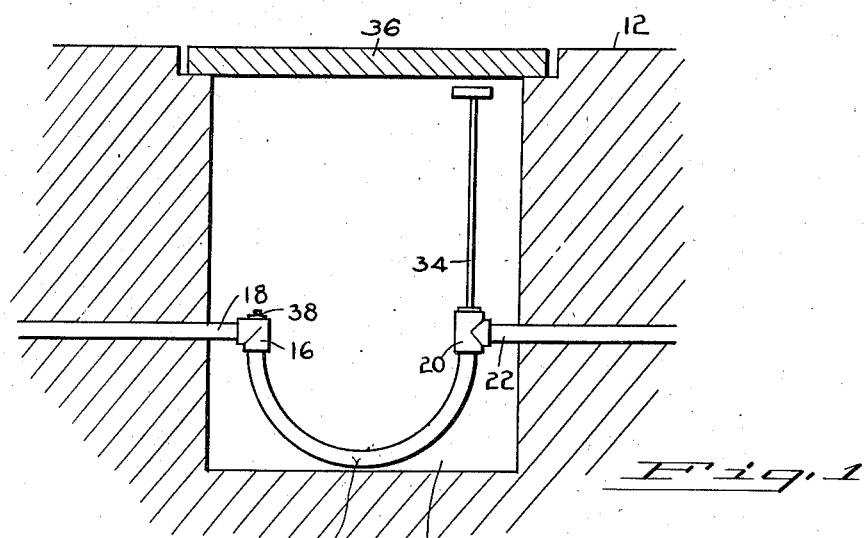
Fig. 1 is a more or less diagrammatical view partly in elevation and partly in section of a drain-pipe system embodying the present invention.

Referring to the drawing in detail, there is shown by way of illustration of the present invention, a pit 10 formed below the level of the basement floor 12. A trap 14 is positioned at the bottom of the pit and has its inlet end 16 connected to the inlet drain pipe 18 and its outlet end 20 connected to the outlet drain pipe 22. Said pipe 18 is connected to the drain pipes of the usual plumbing fixtures and the outlet pipe 22 is connected to the sewer pipe in the usual way. With comparatively few exceptions, when the drain-pipe system is obstructed, the cause of the obstruction is found in the trap and, more particularly, between the inlet and outlet ends thereof. It is therefore usually necessary in order to free the system from the obstruction to open the trap and remove the cause of the obstruction, but before doing so, the liquid which has accumulated in the pit 10 must be removed. As stated, this was done heretofore by bailing out the pit.

Figure 2:
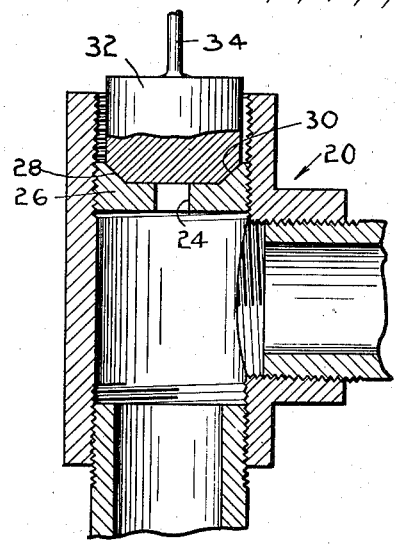
Fig. 2 is a longitudinal sectional view, on an enlarged scale, of the outlet end of the trap.
Figure 4:
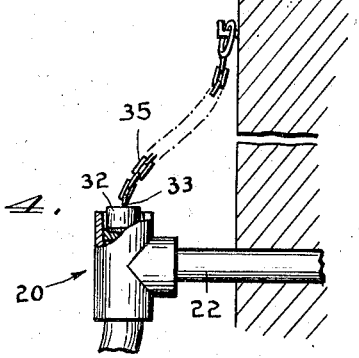
Fig. 4 is a view similar to Fig. 1, showing another modification.

In accordance with the present invention, provision is made for permitting the liquid to drain from the pit into the outlet pipe 22. For this purpose, the outlet end 20 of the trap is provided with an opening 24 which may be placed in communication with the pit 10, thus affording a passage for the flow of liquid from the pit into the outlet pipe 22. It is important to provide a fluid-tight seal for said opening, not only to prevent the passage of liquid from the trap into the pit, but also to prevent the flow of sewer gas from the outlet pipe 22 into the pit. As shown in Fig. 2, the opening 24 is formed in a bushing 26 which is screw threaded into the outlet end 20 of the trap 14 in fluid-tight engagement therewith. The upper surface of the bushing 26 is provided with a bevelled surface 28 forming a seat for the bevelled end 30 of a plug valve 32. Said valve, in closed position, has a fluid-tight engagement with the bushing and normally seals the opening 24 to prevent the passage of fluids from the trap or outlet pipe 22 into the pit. In order to operate the valve 32 for unsealing the opening 24 to permit liquid to drain from the pit when access to the trap is desired, the valve 32 is provided with a relatively long stem or rod 34 which extends to a point adjacent the top of the pit. The pit is normally closed by a cover 36 which may be removed when the pit is to be drained. The inlet end 16 of the trap is provided with a fluid-tight closure plug 38 of any suitable construction. Thus, when the trap is blocked, the opening 24 may be unsealed by lifting the valve plug 32 from the bushing seat 28, thereby placing said opening in communication with the pit 10 so that the liquid which may have accumulated therein can drain into the outlet pipe 22. After the liquid has drained from the pit, the plumber or other repair man can enter the pit and clean the trap in the usual way. In lieu of the stem or rod 34, there may be utilized a chain 35 connected to an eye 33 provided at the upper end of the valve 32, as illustrated in Fig. 4.

Figure 3:
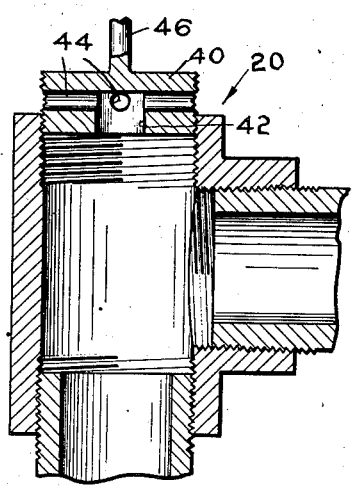
Fig. 3 is a view similar to Fig. 2, showing a modification.

In the form of the invention illustrated in Fig. 3, the opening for placing the pit in communication with the outlet end of the trap is provided in a valve plug 40 having a central fluid passage 42 arranged in communication with lateral openings 44 extending to the outer surface of said plug. Normally, said plug has a threaded engagement with the outlet end of the trap and forms a fluid-tight joint therewith. Said plug, however, may be unthreaded to position the lateral openings 44 above the upper end of the trap to permit water to pass from the pit into the outlet pipe. Said plug has a rod 46 which extends to the top of the pit whereby to permit unscrewing of said plug for unsealing the opening for draining the pit. In lieu of a plug having openings therein, a solid plug may be used and entirely disconnected from the trap when the drain opening is to be unsealed.

Thus it is seen that the constructions herein shown and described are well adapted to accomplish the several objects of the present invention. It will be understood, however, that the invention may be embodied otherwise than as here shown, and that certain changes in the construction and arrangement of parts may be made without departing from the spirit of the invention. Therefore, I do not wish to be limited precisely to the present disclosure or to any part thereof except as may be required by the appended claims considered with reference to the prior art.

Having thus described my invention, what I claim and desire to secure by Letters Patent of the United States is:

1. A drain-pipe system for buildings comprising a pit below the building floor, a trap located within and at the bottom of said pit and having inlet and outlet ends within said pit and connected to the ends of inlet and outlet drain pipes, respectively, in said pit, means for providing a fluid passage for the flow of liquid from said pit to said outlet pipe, means connected to the outlet end of said trap for normally sealing said passage, and means connected to said sealing means and operable from a point adjacent the top of said pit for unsealing said passage to permit liquid in the pit to flow therefrom at the outlet end of said trap into said outlet pipe.

2. A drain-pipe system for buildings comprising a pit below the building floor, a trap located at the bottom of said pit and connected to the ends of inlet and outlet drain pipes at the inlet and outlet ends of the trap, respectively, in said pit, means for providing a fluid passage for the flow of liquid from said pit to said outlet pipe comprising a bushing in the outlet end of said trap provided with an opening adapted to be placed in communication with the pit, means for normally sealing said passage comprising a valve for closing said opening, and means connected to said valve and operable from a point adjacent the top of said pit for moving said valve to open position.

3. A drain-pipe system for buildings comprising a pit below the building floor, a trap located at the bottom of said pit and connected to the ends of inlet and outlet drain pipes at the inlet and outlet ends of the trap, respectively, in said pit, means for providing a fluid passage for the flow of liquid from said pit to said outlet pipe comprising a bushing in the outlet end of said trap provided with an opening adapted to be placed in communication with the pit, the upper surface of said bushing having a tapered valve seat, and a tapered valve engageable with said seat for sealing said opening and movable off said seat for unsealing said opening.

4. A drain-pipe system for buildings comprising a pit below the building floor, a trap located at the bottom of said pit and connected to the ends of inlet and outlet drain pipes at the inlet and outlet ends of the trap, respectively, in said pit, means for providing a fluid passage for the flow of liquid from said pit to said outlet pipe comprising a bushing in the outlet end of said trap provided with an opening adapted to be placed in communication with the pit, the upper surface of said bushing having a tapered valve seat, a tapered valve engageable with said seat for sealing said opening and movable off said seat for unsealing said opening, and means connected to said valve and operable from a point adjacent the top of said pit for unsealing said passage to permit liquid in the pit to flow therefrom into said outlet pipe.

5. A drain-pipe system for buildings comprising a pit below the building floor, a trap located at the bottom of said pit and connected to the ends of inlet and outlet drain pipes at the inlet and outlet ends of the trap, respectively, in said pit, means for providing a fluid passage for the flow of liquid from said pit to said outlet pipe, means for normally sealing said passage comprising a plug having a screw-threaded engagement with the outlet end of said trap, forming a fluid-tight engagement therewith, and means for unthreading said plug to place said outlet end of the trap in communication with the pit comprising a member operatively connected to said plug and operable from a point adjacent the top of said pit for unsealing said passage to permit the liquid in the pit to flow therefrom into the outlet end of said trap.

SAMUEL J. GABER.